United States Patent [19]

Washizu

[11] Patent Number: 4,730,856
[45] Date of Patent: Mar. 15, 1988

[54] PIPE JOINT FOR CONNECTING A PIPE HAVING A SMALL DIAMETER

[75] Inventor: Katsushi Washizu, Sunto, Japan

[73] Assignee: Usui Kokusai Sangyo Kabushika Kaisha, Shizuoka, Japan

[21] Appl. No.: 55,034

[22] Filed: May 28, 1987

[51] Int. Cl.$^4$ .................................................. F16L 39/00
[52] U.S. Cl. ........................................ 285/319; 285/346; 285/351; 285/921
[58] Field of Search ............... 285/319, 924, 351, 921, 285/348

[56] References Cited

U.S. PATENT DOCUMENTS

| | | | |
|---|---|---|---|
| 2,550,591 | 4/1951 | Parsons | 285/314 |
| 3,453,005 | 7/1969 | Foults | 285/424 X |
| 3,603,621 | 9/1971 | Parsons | 285/319 |
| 4,462,654 | 7/1984 | Aiello | 285/421 X |

FOREIGN PATENT DOCUMENTS 2291438   6/1976   France ............................... 285/424

*Primary Examiner*—Dave W. Arola
*Attorney, Agent, or Firm*—Anthony J. Casella; Gerald E. Hespos

[57] ABSTRACT

A pipe joint for connecting a pipe having a relatively small diameter includes a generally cylindrical main body having an axial bore in which an end portion of the pipe and a plurality of seal rings surrounding the end portion of the pipe can be fitted. The main body has a tubular extension defining a connector for another tubular member to be connected to the pipe by the joint and having an axial bore which can be connected with that of the pipe. The main body also has a plurality of pawl projections or a shoulder on its outer peripheral surface. The pipe has a radially outwardly projecting wall portion near its end portion. A generally cylindrical cap has an end wall portion provided therethrough with a central opening through which the pipe can extend into the main body, and a plurality of resilient arms projecting from its end wall portion. Each arm has adjacent to its free end a hole in which one of the pawl projections on the main body can be received, or a pawl projection which is engageable with the shoulder on the main body. The end wall portion of the cap is engageable with the radially outwardly projecting wall portion of the pipe to hold the pipe in its properly connected position.

5 Claims, 3 Drawing Figures

PIPE JOINT FOR CONNECTING A PIPE HAVING A SMALL DIAMETER

BACKGROUND OF THE INVENTION

1. Field of the Invention

This invention relates to an improved pipe joint for connecting, for example, a metal pipe and a synthetic resin tube which are used to form a pipeline having a relatively small diameter not exceeding about 15 mm for supplying oil or air to an automobile, machine or apparatus.

2. Description of the Prior Art

A known pipe joint of the type to which this invention pertains is shown by way of example in FIG. 3. It comprises a main body 21 having an axial bore 22 in which a pipe $P_1$ is received at one end thereof. The main body 21 is provided at one end thereof with an axially projecting connecting portion 23. The bore 22 has a diameter which increases in a plurality of steps as it becomes remoter from the connecting portion 23. The connecting portion 23 has an axial bore connected with the bore 22. The main body 21 has a wall portion 24 within which the bore 22 has its maximum diameter, and which is provided therethrough with a plurality of holes 26. Each hole 26 defines a radially outwardly projecting flange 25 at the other end of the main body 21 remote from the connecting portion 23. A pair of seal rings are provided between the pipe $P_1$ and the inner surface of that portion of the main body 21 in which the bore 22 has its minimum diameter. The pipe $P_1$ has a radially outwardly projecting wall portion $P_1'$ which is located in the main body 21 when it is connected thereinto. The joint also includes a generally cylindrical supporting member 27 which can be resiliently fitted into the main body 21 through the opening at the other end thereof. The supporting member 27 has a plurality of elastic wall portions 28 each having a radially outwardly projecting shoulder received in one of the holes 26 and held against the flange 25. Each wall portion 28 has a radially and axially inwardly directed pawl engaging the radially outwardly projecting wall portion $P_1'$ of the pipe $P_1$ to hold the pipe $P_1$ in position.

The supporting member 27, however, has an open end 29 surrounding the pipe $P_1$. The open end 29 and the holes 26 of the main body 21 allow dust, water and other foreign matter to enter the joint. The dust, water, etc. are likely to disable the maintenance of a tight seal between the seal rings and the pipe $P_1$. When the pipe which has been disconnected is connected again, it is often difficult to obtain a leakproof connection.

SUMMARY OF THE INVENTION

Therefore, it is an object of this invention to provide an improved pipe joint which can effectively overcome the drawbacks of the prior art as hereinabove pointed out, and which is suitable for repeated use for a long period of time without allowing any dust, water or other foreign matter to enter it.

This object is attained by a pipe joint comprising a generally cylindrical main body having an axial bore in which an end portion of a pipe and a plurality of seal rings surrounding the end portion of the pipe can be fitted, the main body having a tubular extension defining a connector for another tubular member to be connected to the pipe by the joint and having an axial bore which can be connected with that of the pipe, the main body also having cap engaging means projecting from its outer peripheral surface; the pipe having a radially outwardly projecting wall portion provided near its end portion; and a generally cylindrical cap having an end wall portion provided therethrough with a central opening through which the pipe can extend into the main body, and a plurality of resilient arms projecting from the end wall portion and each having a free end provided with means with which the cap engaging means of the main body is engageable, the end wall portion of the cap being engageable with the radially outwardly projecting wall portion of the pipe to hold the pipe in its properly connected position.

The cap engaging means may comprise a plurality of pawllike projections and each of the resilient arms may have adjacent to its free end a hole in which one of the pawllike projections can be received. Alternatively, the cap engaging means may comprise a radially extending shoulder and each of the arms may have at its free end a radially inwardly extending pawllike projection which is engageable with the shoulder.

When the cap is placed about the main body, they form an effectively closed joint assembly and do not permit any dust, water or other foreign matter to enter it. There is no possibility that dust, water, etc. may adversely affect a tight seal between the seal rings and the pipe. Therefore, the joint can be used repeatedly for a long period of time for connecting or disconnecting a pipeline. The cap can be easily removed from the main body whenever required.

DETAILED DESCRIPTION OF THE INVENTION

Figure 1:
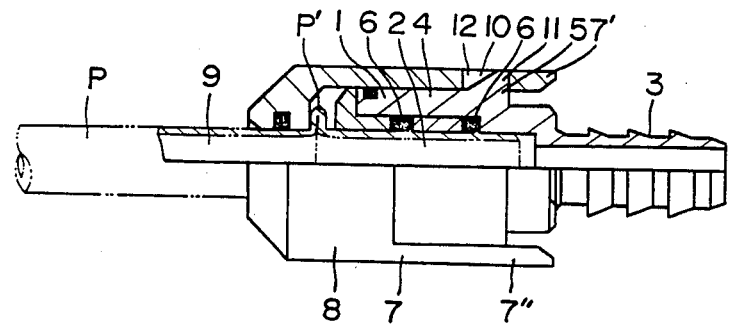
FIG. 1 is a front elevational view, partly in section, of a pipe joint embodying this invention.

A pipe joint embodying this invention is shown by way of example in FIG. 1. It comprises a generally cylindrical main body 1 having an axial bore 2 in which an end portion of a pipe P is fitted. A pair of seal rings 6 are provided in the bore 2 and surround the pipe P. The seal rings 6 are axially spaced apart from each other by an annular spacer. The seal rings 6 and the spacer are held in position by a flanged bush fitted into the bore 2. The main body 1 has an axial tubular extension 3 defining a connector for, say, a synthetic resin tube or rubber hose to be connected to the pipe P by the joint. The tubular extension 3 has an axial bore which is smaller in diameter than the bore 2. The main body 1 also has a plurality of pawllike projections 11 on its outer peripheral surface adjacent to the tubular extension 3.

A generally cylindrical cap 7 comprises a metal or plastic tube. The cap 7 has an end wall portion 8 provided with a central opening 9 through which the pipe P extends into the main body 1. A pair of diametrically opposite resilient arms 7' and 7" extend from the end wall portion 8. Each arm has adjacent to its free end a hole 12 in which one of the pawllike projections 11 on the main body 1 is received, whereby the cap 7 is removably secured to the main body 1.

The pipe P has a radially outwardly projecting wall portion P' adjacent to its end portion which is fitted in the bore 2. The end wall portion 8 of the cap 7 is engaged with the wall portion P' to hold the pipe P in its properly connected position. Another seal ring 15 is provided between the end wall portion 8 of the cap 7 and the pipe P.

Figure 2:
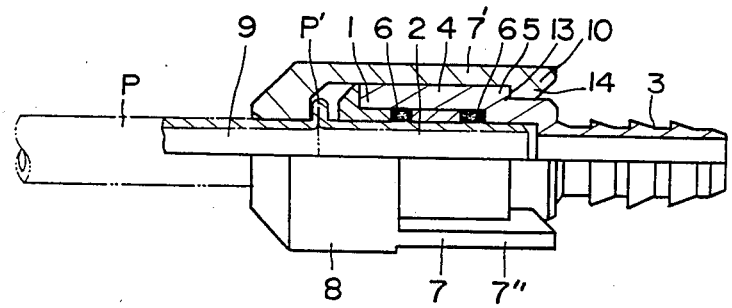
FIG. 2 is a view similar to FIG. 1, but showing another embodiment of this invention.
Figure 3:
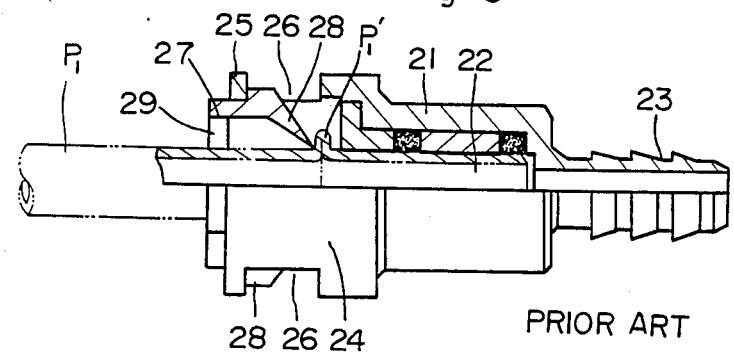
FIG. 3 is a front elevational view, partly in section, of a known joint.

Another embodiment of this invention is shown in FIG. 2. The joint shown in FIG. 2 is substantially identical in construction to the joint shown in FIG. 1. Therefore, only the features which differentiate the joint of FIG. 2 from that of FIG. 1 will hereinafter be described. The cap engaging means 5 that is employed by the joint of FIG. 2 comprises a radially extending shoulder 13. The cap 7 has three resilient arms which are circumferentially equally spaced apart from one another, though only two arms 7' and 7" are shown in FIG. 2. Each arm has at its free end a radially inwardly extending pawl-like projection 14 which is engaged with the shoulder 13. The projections 14 define the means 10 with which the cap engaging means 5 is engageable, while in the joint of FIG. 1, the pawllike projections 11 on the main body 1 define the cap engaging means 5 and the holes 12 define the means 10.

It is, of course, possible to employ a cap having more than three resilient arms.

What is claimed is:

1. A pipe joint for connecting a pipe and a tubular member, said pipe comprising an end portion extending inwardly from one axial end of said pipe and further comprising a radially outwardly projecting wall portion adjacent the end portion of said pipe, said end portion being dimensioned to and receiving a plurality of annular seal rings thereabout, said pipe joint comprising:

a generally cylindrical main body having opposed first and second axial ends, and being characterized by an axial bore extending entirely therethrough, the first axial end of said main body defining a tubular extension dimensioned to connect with said tubular member, said axial bore of said main body being characterized by at least one annular step generally facing said first end of said main body and defining a smaller cross-sectional portion of said axial bore, the portion of said axial bore intermediate said annular step and said second end being dimensioned to receive both the end portion of said pipe and the annular seal rings mounted thereabout, said main body further comprising cap engaging means projecting from its outer peripheral surface;

a flanged bush comprising a generally cylindrical portion dimensioned to be received intermediate said main body and the end portion of said pipe and to retain said seal rings intermediate said annular step and the flanged bush, said flanged bush further comprising an outwardly extending annular flange dimensioned to abut against the second end of said main body;

a generally cylindrical cap having an end wall portion provided with a central opening dimensioned to permit the pipe to be extended therethrough, and a plurality of resilient arms projecting from said end wall portion, each of said resilient arms having a free end provided with means with which said cap engaging means of said main body is engageable, said end wall portion being engageable with said wall portion of said pipe to hold said pipe in a connected position relative to said main body, said end wall further surrounding at least the flanged bush and the second end of said main body to prevent intrusion of dirt to said joint.

2. A pipe joint as set forth in claim 1, wherein said arms consist of a pair of diametrically opposite arms.

3. A pipe joint as set forth in claim 1, wherein said arms consist of at least three arms which are circumferentially equally spaced apart from one another.

4. A pipe joint as set forth in claim 1, wherein said cap engaging means comprises a plurality of pawl like projections provided on the outer peripheral surface of said main body, while said means with which said cap engaging means is engageable comprises a plurality of holes each provided in one of said arms.

5. A pipe joint as set forth in claim 1, wherein said cap engaging means comprises a radially extending shoulder provided on the outer peripheral surface of said main body, while said means with which said cap engaging means is engageable comprises a plurality of radially inwardly directed pawl like projections each provided on one of said arms.

* * * * *